United States Patent
MacKenzie

(10) Patent No.: US 12,302,809 B2
(45) Date of Patent: May 20, 2025

(54) INTERLOCKING MODULAR PLANTING SYSTEM FOR ROOF APPLICATIONS

(71) Applicant: Hortech, Inc., Nunica, MI (US)

(72) Inventor: David S. MacKenzie, Nunica, MI (US)

(73) Assignee: Hortech, Inc., Nunica, MI (US)

( * ) Notice: Subject to any disclaimer, the term of this patent is extended or adjusted under 35 U.S.C. 154(b) by 286 days.

(21) Appl. No.: 17/660,091

(22) Filed: Apr. 21, 2022

(65) Prior Publication Data

US 2022/0240459 A1   Aug. 4, 2022

Related U.S. Application Data

(60) Continuation-in-part of application No. 15/941,354, filed on Mar. 30, 2018, now abandoned, which is a division of application No. 13/538,254, filed on Jun. 29, 2012, now abandoned.

(51) Int. Cl.
*A01G 9/033* (2018.01)

(52) U.S. Cl.
CPC .......... *A01G 9/033* (2018.02); *Y02A 30/254* (2018.01); *Y02B 80/32* (2013.01); *Y10T 29/49826* (2015.01)

(58) Field of Classification Search
USPC ................ 47/65.9, 39, 86, 66.5, 66.1, 66.3; 446/111, 112, 113, 122, 123; 403/217, 403/219, DIG. 10, DIG. 15
See application file for complete search history.

(56) References Cited

U.S. PATENT DOCUMENTS

| | | | |
|---|---|---|---|
| 597,519 A * | 1/1898 | Souchet | |
| 1,070,375 A | 8/1913 | Reyam et al. | |
| 1,637,567 A | 8/1927 | Herrick | |
| 2,423,724 A | 7/1947 | Paxton | |
| 2,655,283 A | 10/1953 | Moldt | |
| 3,299,601 A | 1/1967 | Chiville | |
| 3,386,608 A | 6/1968 | Diller | |
| 3,605,366 A | 9/1971 | Zakim | |
| 3,651,976 A | 3/1972 | Chadbourne | |
| 3,827,177 A * | 8/1974 | Wengel | A63H 33/101 446/124 |
| 3,827,818 A | 8/1974 | Ruyters | |
| 3,855,748 A * | 12/1974 | Thomas | A63B 9/00 52/578 |
| 3,891,335 A | 6/1975 | Feil | |
| 3,950,908 A | 4/1976 | Van Eyk | |

(Continued)

FOREIGN PATENT DOCUMENTS

| DE | 3535448 | 4/1987 |
|---|---|---|
| DE | 3712867 | 11/1988 |

(Continued)

*Primary Examiner* — Andrea M Valenti
(74) *Attorney, Agent, or Firm* — Price Heneveld LLP

(57) ABSTRACT

A method of installing a roof planter assembly includes providing first and second planter modules each including a bottom wall and a plurality of sidewalls that cooperate with the bottom wall to form an interior space adapted to receive plant matter therein, wherein at least a pair of the plurality of sidewalls cooperate to form a corner therebetween, the corner including first and second portions along a length of the corner and having bottom and top edges, respectively, that are entirely horizontally offset and spaced from one another.

16 Claims, 9 Drawing Sheets

(56) References Cited

U.S. PATENT DOCUMENTS

| | | |
|---|---|---|
| 4,058,930 A | 11/1977 | Miles |
| 4,111,585 A | 9/1978 | Mascaro |
| 4,111,892 A | 9/1978 | Kamada et al. |
| 4,118,892 A | 10/1978 | Nakamura et al. |
| 4,453,359 A | 6/1984 | Robinson |
| 4,655,018 A | 4/1987 | Pardo |
| 4,674,245 A | 6/1987 | Turner |
| 4,926,586 A | 5/1990 | Nagamatsu |
| 4,999,946 A | 3/1991 | DeGigiglio et al. |
| 5,022,183 A | 6/1991 | Bohlmann |
| 5,111,627 A | 5/1992 | Brown |
| 5,161,710 A | 11/1992 | Chumley |
| 5,187,894 A | 2/1993 | Ripley, Sr. et al. |
| 5,281,185 A * | 1/1994 | Lee .................. A63H 33/10 446/85 |
| 5,281,459 A | 1/1994 | Van Eijck |
| 5,309,846 A | 5/1994 | Peterson |
| 5,467,555 A | 11/1995 | Ripley, Sr. et al. |
| 5,595,021 A | 1/1997 | Ripley, Sr. et al. |
| 5,953,859 A | 9/1999 | Cochran et al. |
| 6,178,690 B1 | 1/2001 | Yosida et al. |
| 6,237,285 B1 | 5/2001 | Yoshida et al. |
| 6,460,301 B1 | 10/2002 | McKee |
| 6,536,361 B1 | 3/2003 | Wu |
| 6,606,823 B1 | 8/2003 | McDonough et al. |
| 6,655,103 B1 | 12/2003 | Lueghamer |
| 6,711,851 B2 | 3/2004 | Mischo |
| 6,862,842 B2 | 3/2005 | Mischo |
| 6,911,248 B2 | 6/2005 | Sabatini |
| 7,344,334 B2 | 3/2008 | Thorkelson |
| 7,603,808 B2 | 10/2009 | Carpenter et al. |
| 2002/0007591 A1 | 1/2002 | Mischo |
| 2004/0040209 A1 | 3/2004 | Layt et al. |
| 2005/0102921 A1 | 5/2005 | Mischo |
| 2008/0168710 A1 | 7/2008 | MacKenzie |
| 2013/0239476 A1 * | 9/2013 | Meyer .................. A01G 25/00 47/65.9 |
| 2014/0250782 A1 * | 9/2014 | Visser .................. A01G 9/02 47/65.9 |

FOREIGN PATENT DOCUMENTS

| | | |
|---|---|---|
| EP | 1306485 | 2/2003 |
| FR | 2703213 | 10/1994 |
| GB | 2074433 | 11/1981 |
| JP | 11155369 | 6/1999 |

* cited by examiner

INTERLOCKING MODULAR PLANTING SYSTEM FOR ROOF APPLICATIONS

CROSS-REFERENCE TO RELATED APPLICATIONS

This application is a continuation-in-part of and claims priority to U.S. patent application Ser. No. 15/941,354, entitled "INTERLOCKING MODULAR PLANTING SYSTEM FOR ROOF APPLICATIONS," filed Mar. 30, 2018, which is a divisional of and claims priority to U.S. patent application Ser. No. 13/538,254, entitled "INTERLOCKING MODULAR PLANTING SYSTEM FOR ROOF APPLICATIONS," filed on Jun. 29, 2012, the disclosures of which are hereby incorporated herein by reference in their entirety.

BACKGROUND OF THE INVENTION

The present invention relates to a modular planting system for roof applications, and in particular to a modular planting system that includes a plurality of planter modules each including a planter for receiving plant matter therein, and a coupling member for securing the plant modules to one another, thereby creating a green-roof system.

SUMMARY OF THE INVENTION

One embodiment as disclosed and described herein includes a roof planter assembly that includes a first planter module including a bottom wall and a plurality of sidewalls that cooperate with the bottom wall of the first planter module to form an interior space of the first planter module configured to receive plant matter therein, wherein at least a pair of the plurality of sidewalls of the first planter module cooperate to form a first corner therebetween, the first corner including a first portion and a second portion each positioned along a vertical length of the first corner, the first portion having a bottom edge and the second portion have a top edge defining a first relief therebetween, wherein the top edge is entirely horizontally offset from the bottom edge, and a second planter module including a bottom wall and a plurality of sidewalls that cooperate with the bottom wall of the second planter module to form an interior space of the second planter module configured to receive plant matter therein, wherein at least a pair of the plurality of sidewalls of the second planter module cooperate to form a second corner therebetween, the second corner including a first portion and a second portion each positioned along a vertical length of the second corner, the first portion of the second corner having a bottom edge and the second portion of the second corner have a top edge defining a second relief therebetween, wherein the top edge of the first portion of the second corner being is horizontally offset from the bottom edge of the second portion of the second corner. The embodiment further includes a coupling member removably received within the first relief and the second relief, thereby inhibiting vertical movement of the first planter module with respect to the second planter module.

Another embodiment as disclosed and described herein may further or alternatively include a roof planter module that includes a bottom wall, a plurality of sidewalls, an interior space formed by the bottom wall and the plurality of sidewalls, wherein the interior space is configured to receive plant matter therein, and a corner formed between a pair of the plurality of sidewalls, the corner including a first portion and a second portion each positioned along a vertical length of the corner, the first portion having a bottom edge and the second portion have a top edge defining a slot therebetween where the slot extends longitudinally along the pair of sidewalls, wherein the top edge is entirely horizontally offset from the bottom edge, wherein the slot is configured to receive a coupling member configured to couple an adjacent roof planter module to the roof planter module.

Yet another embodiment as disclosed and described herein may further or alternatively include a method of installing a roof planter assembly that includes providing a first planter module including a bottom wall and a plurality of sidewalls that cooperate with the bottom wall of the first planter module to form an interior space of the first planter module configured to receive plant matter therein, wherein at least a pair of the plurality of sidewalls of the first planter module cooperate to form a first corner therebetween, the first corner including a first portion and a second portion each positioned along a vertical length of the first corner, the first portion having a bottom edge and the second portion have a top edge defining a first relief therebetween, wherein the top edge is entirely horizontally offset from the bottom edge, and providing a second planter module including a bottom wall and a plurality of sidewalls that cooperate with the bottom wall of the second planter module to form an interior space of the second planter module configured to receive plant matter therein, wherein at least a pair of the plurality of sidewalls of the second planter module cooperate to form a second corner therebetween, the second corner including a first portion and a second portion each positioned along a vertical length of the second corner, the first portion of the second corner having a bottom edge and the second portion of the second corner have a top edge defining a second relief therebetween, wherein the top edge of the first portion of the second corner being is horizontally offset from the bottom edge of the second portion of the second corner. The method may further include providing a coupling member configured to be received within the first relief and the second relief, positioning the first corner of the first planter module and the second corner of the second planter module proximate one another, and inserting the coupling member into the first relief of the first planter module and the second relief of the second planter module, thereby inhibiting vertical movement of the first planter module with respect to the second planter module.

These and other advantages of the invention will be further understood and appreciated by those skilled in the art by reference to the following written specification, claims and appended drawings.

DETAILED DESCRIPTION OF THE PREFERRED EMBODIMENTS

Figure 2:
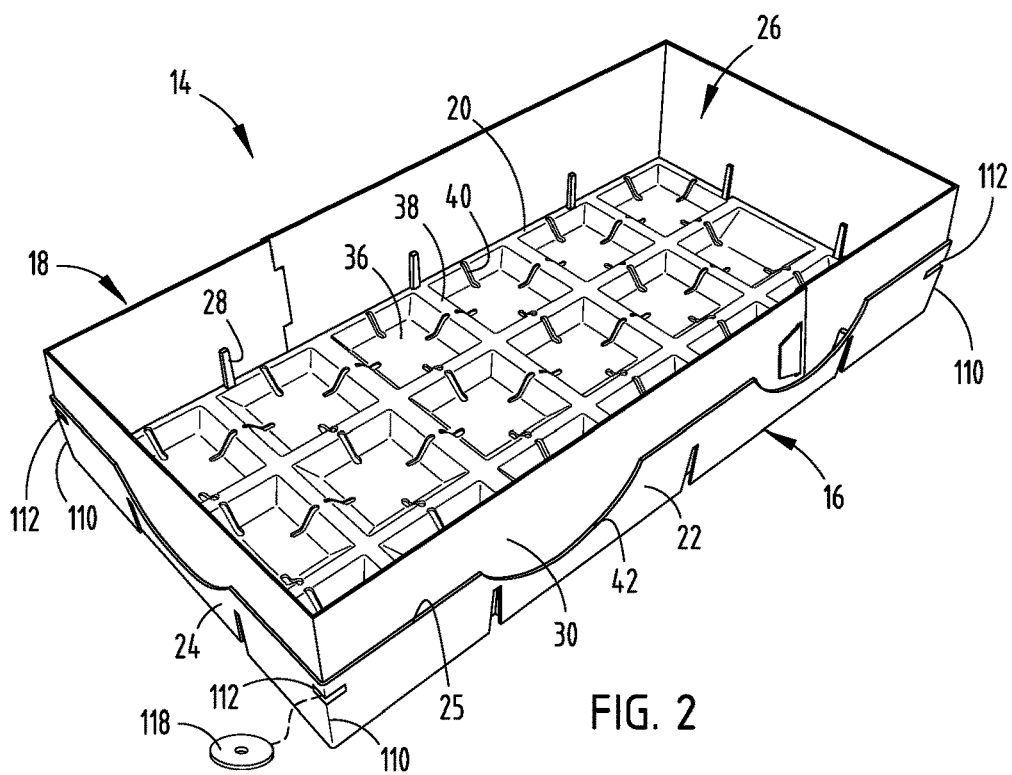
FIG. 2 is a perspective view of a green roof planter module that includes a collar member removably inserted into an associated planter, and a coupling member.
Figure 7:
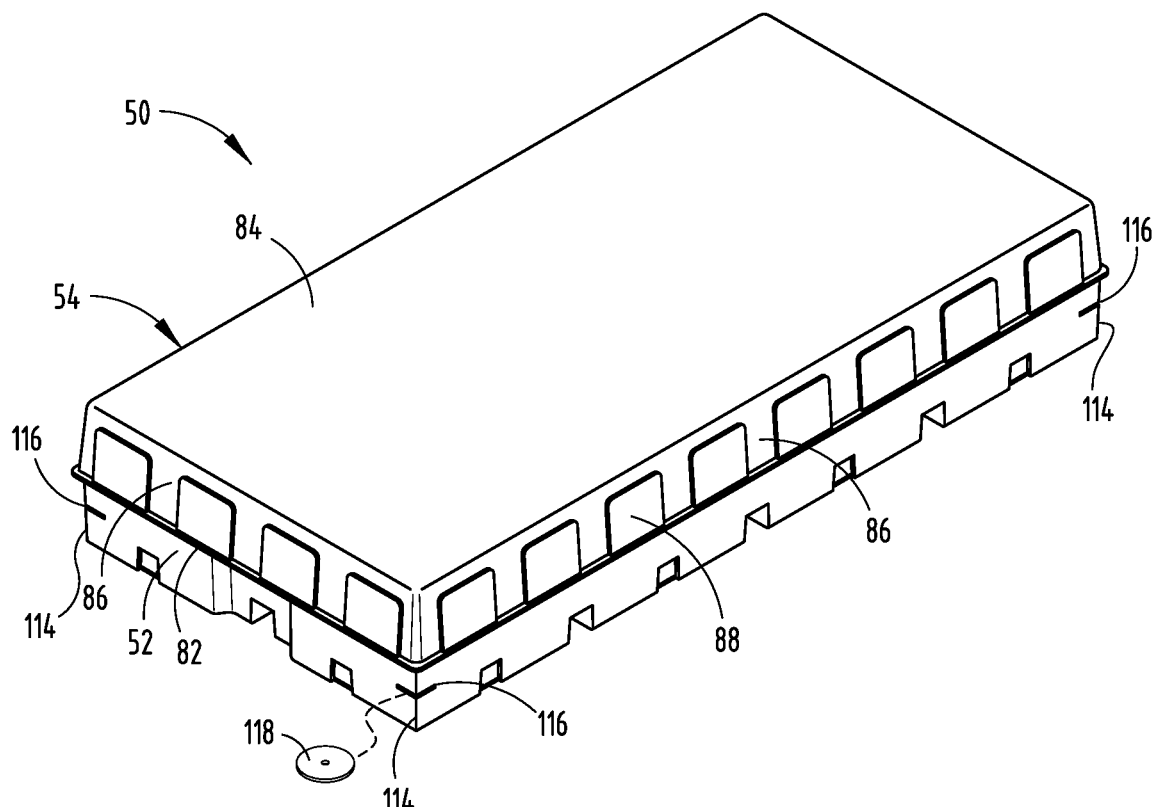
FIG. 7 is a perspective view of an individual paver assembly.

For purposes of description herein, the terms "upper," "lower," "right," "left," "rear," "front," "vertical," "horizontal," and derivatives thereof shall relate to the invention as oriented in FIGS. 2 and 7. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
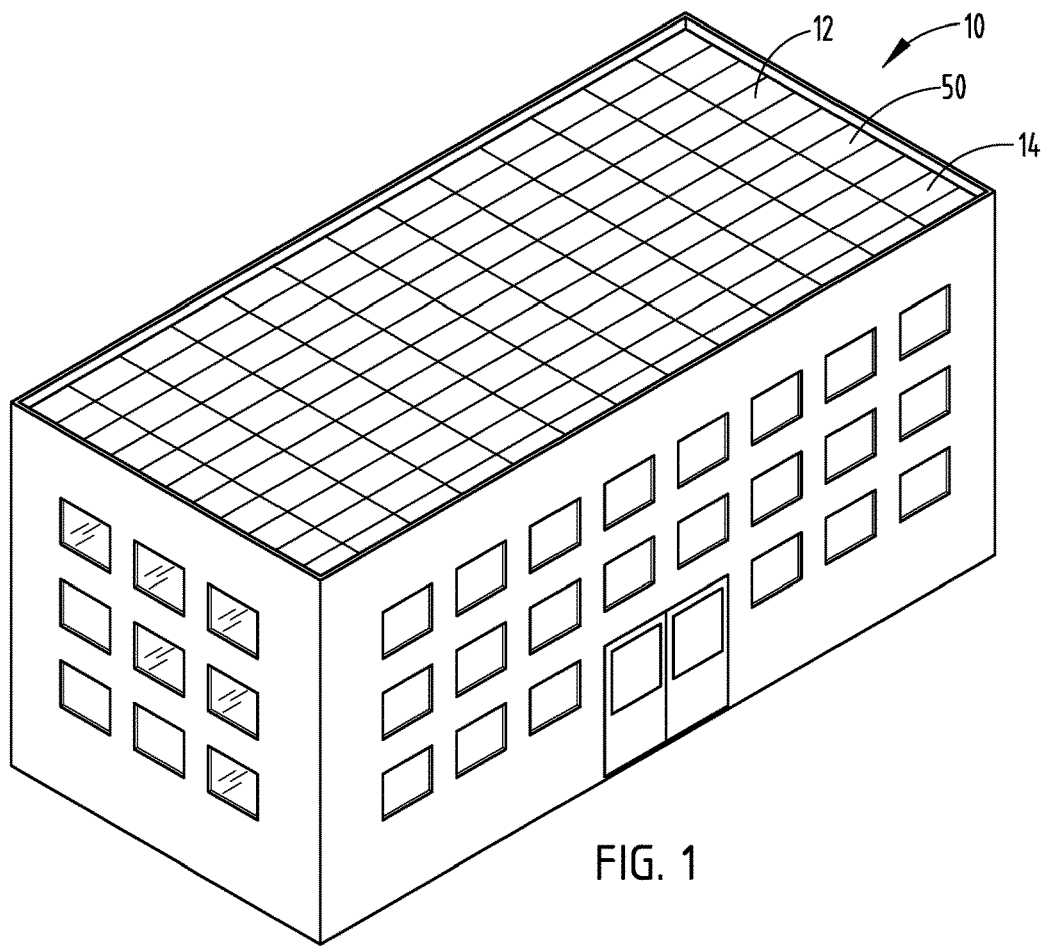
FIG. 1 is a perspective view of a building employing a green roof system embodying the present invention.
Figure 3:
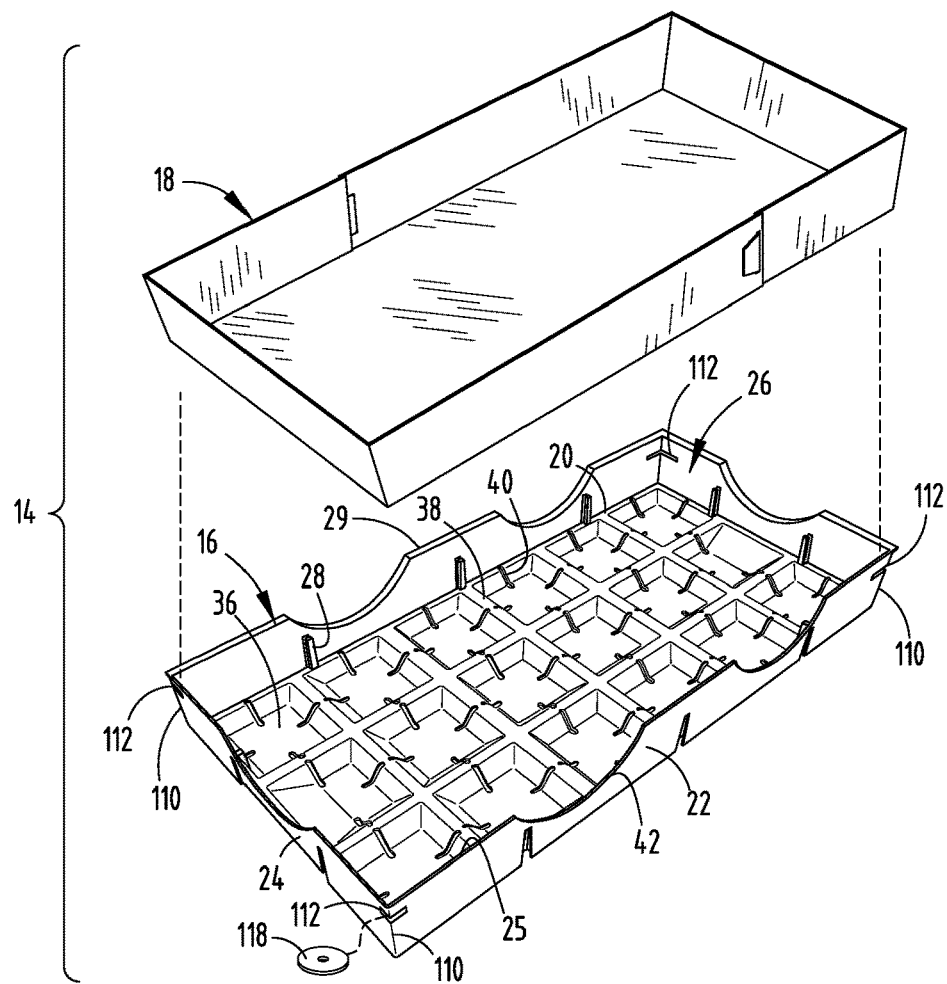
FIG. 3 is an exploded perspective view of the planter module.

The reference numeral 10 (FIG. 1) generally designates a green roof system embodying the present invention and employed on a building roof 12 and comprising a plurality of individual green roof planter modules 14. In the illustrated example, each of the planter modules 14 (FIGS. 2 and 3) comprises a planter 16 and a removable collar 18 inserted into the planter 16 such that the collar 18 extends upwardly from an uppermost edge of the planter 16, thereby allowing the retention of plant matter that extends above an upper edge of the planter 16.

Figure 4:
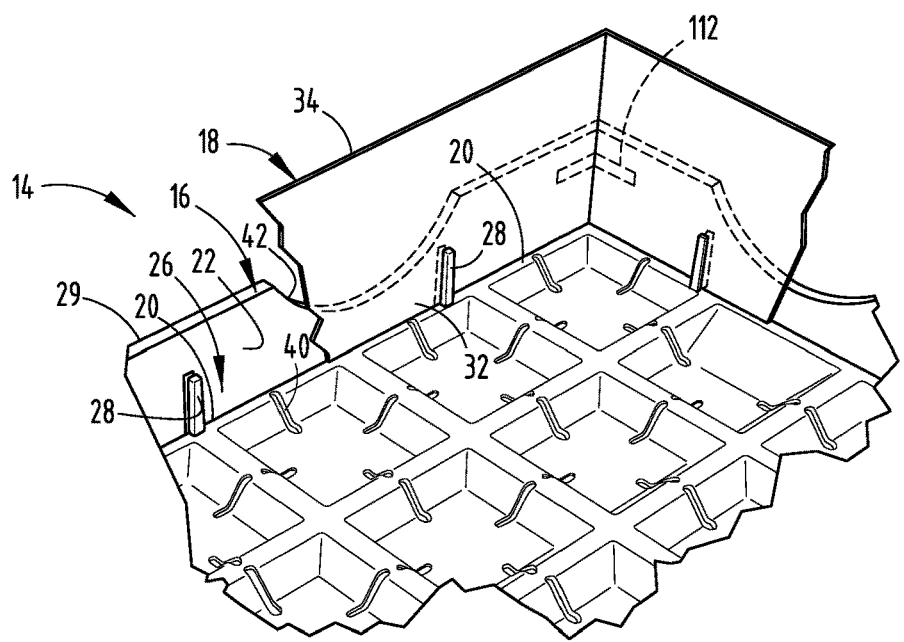
FIG. 4 is an enlarged perspective view of the planter module including a cut-away portion of the collar member inserted into the planter.
Figure 5A:
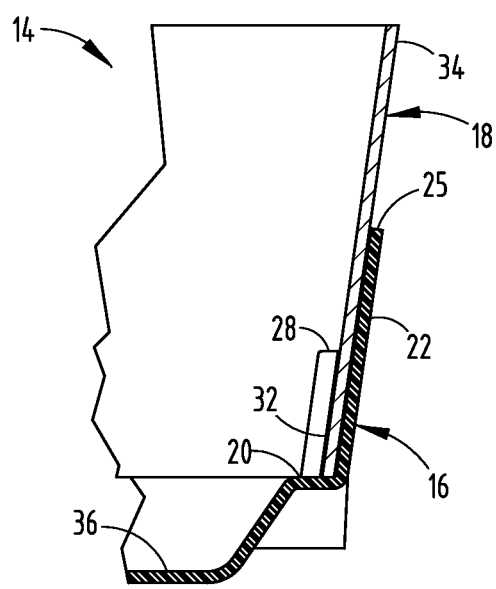
FIG. 5A is a partial cross-sectional end view of the planter module.

Each planter 16 includes a bottom wall 20, a plurality of walls that include sidewalls 22 and end walls 24 that cooperate with the bottom wall 20 to form an interior space 26, and a plurality of support tabs 28 (FIGS. 4 and 5a) spaced about the interior space 26 and that extend inwardly toward the interior space 26. Each of the sidewalls 22 and end walls 24 include a top edge 25. As best illustrated in FIG. 4, each of the support tabs 28 extends upwardly from the bottom wall 20 and is spaced from an associated sidewall 22 or end wall 24. The planter 16 is preferably integrally molded by press forming, and the like, and is constructed of a material such as plastic. In the illustrated example, the planter 16 is providing a rectangularly-shaped overall plan form, however, other configurations may also be utilized. Further, it is noted that the tabs 28 are configured to abut the bottom surface of the bottom wall 20 of another planter 16 when multiple planters are placed in a stacked relationship. As illustrated, one of the sidewalls 22 and one of the end walls 24 each include an outwardly-extending overlap tab 29 that overlaps a respective sidewall or end wall of an adjacent planter 16.

The collar member 18 includes a plurality of walls 30 each having a bottom edge 32 and a top edge 34. In the illustrated example, the collar member 18 comprises two pieces that extend in a rectangular manner about the planter 16. Specifically, the collar member 18 extends about the interior space 26 of the associated planter 16 such that the bottom edge 32 of each of the walls 30 is inserted between the sidewalls and end walls 22, 24 of the planter 16 and the associated support tabs 28, thereby retaining the collar member 18 within the interior space 26 of the planter 16, and such that the walls 30 of the collar member 18 extend upwardly from the top edge 25 of the sidewalls and end walls 22, 24 of the planter 16. Although locking tabs are illustrated between each of the pieces of the collar, overlapping, non-tabbed ends may also be utilized.

In operation, the collar member 18 is inserted into the interior space 26 of planter 16, in a manner described above, and a plant matter that comprises grown plants, plant seedlings, plant seeds and the like, and soil and/or aggregate is also inserted into the interior space 26 of the planter 16. Subsequently, plants are grown within the interior space 26 until such plant matter extends upwardly above the top edge 25 of the sidewalls and end walls 22, 24 of the planter 16. The planter module 14 is then placed in rows or a grid work-like pattern upon a roof 12 (FIG. 1) and the collar member 18 removed such that the plant matter within the interior space 26 of the planter 16 abuts similar plant matter in adjacent planter modules 14, thereby providing a connected roof system that will quickly provide an interconnected and aesthetically-pleasing planted surface. Alternatively, the collar member 18 comprises a biodegradable material that may be left within the planter 16 placed within the overall grid work of the green roof system 10. It is also noted that the walls 30 of the collar member 18 angles outwardly from the sidewalls and end walls 22, 24 of the planter 16, thereby promoting a tight abutment of the plant matter extending above the top edge 25 of the sidewalls and end walls 22, 24 between adjacent planter modules 14.

The proper communication of water between adjacent planters 16 is provided by various elements within the planter 16. As best illustrated in FIG. 2, the bottom wall 20 of the planter 16 comprises a grid work-like pattern of recesses 36 segmented by raised portions 38. A plurality of drainage apertures 40 extend through the recesses 36 and the raised portions 38. It is noted that at least a portion of each of the drainage apertures 40 extend through a lowermost portion of the bottom wall 20, thereby eliminating standing water within the planter 16. Each of the sidewalls and end walls 22, 24 of the planter 16 also include arcuately-shaped recesses or apertures 42 extending therethrough that align with similar apertures of adjacent planters when positioned within the overall gridwork. As illustrated, each of the apertures extends downwardly from the top edge 25 of the sidewalls and end walls 22, 24, a distance that is greater than half of the distance between the top edge 25 and a point at which the bottom wall 20 intersects the sidewalls and/or end wall 22, 24, thereby providing adequate water communication between adjacent planters 16 and further allowing for the migration of plant matter therebetween.

Figure 5B:
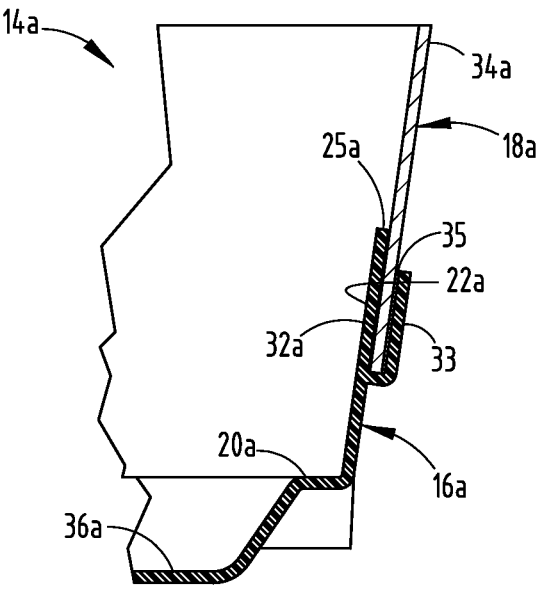
FIG. 5B is a partial cross-sectional end view of an alternative embodiment of the planter module.

The reference numeral 14a (FIG. 5B) generally designates another embodiment of the present inventive planter module. Since the planter module 14a is similar to the previously-described planter module 14, similar parts appearing in FIGS. 2-5a and FIG. 5b, respectively are represented by the same, corresponding reference numeral, except for the suffix "a" in the numerals of the latter. In the planter module 14a, the top edge 25a of each of the sidewalls 22a and end walls 24a include an upwardly-opening channel 33 defining a pocket 35 within which the bottom edge 32a of the collar member 18a is inserted.

Figure 6:
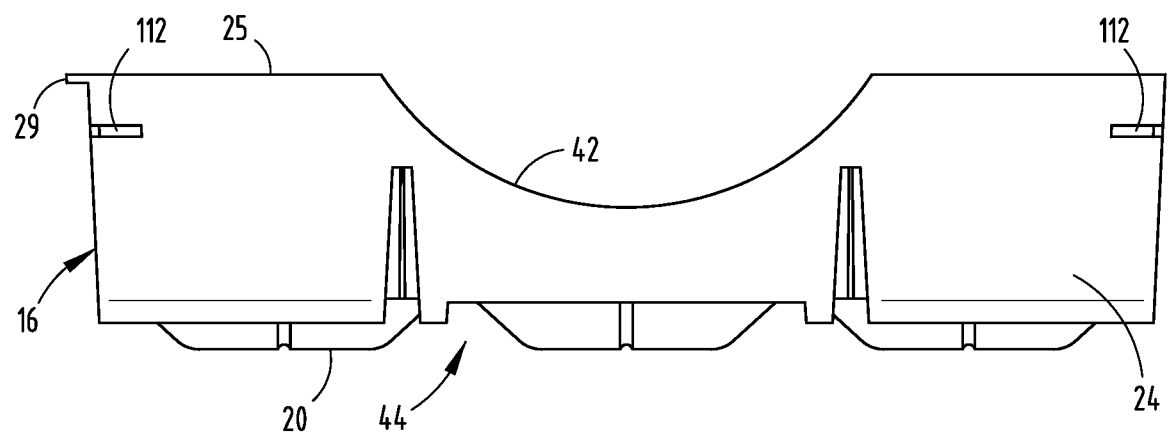
FIG. 6 is an end view of the planter.

The planter 16 (FIG. 6) further includes a pair of gripping reliefs 44 located at each end thereof. Specifically, each relief 44 is provided within the intersection of an associated end wall 24 and the bottom wall 20 such that a user is able to insert their fingers into the reliefs 44, thereby allowing easy gripping and support of the planter module 14.

Figure 8:
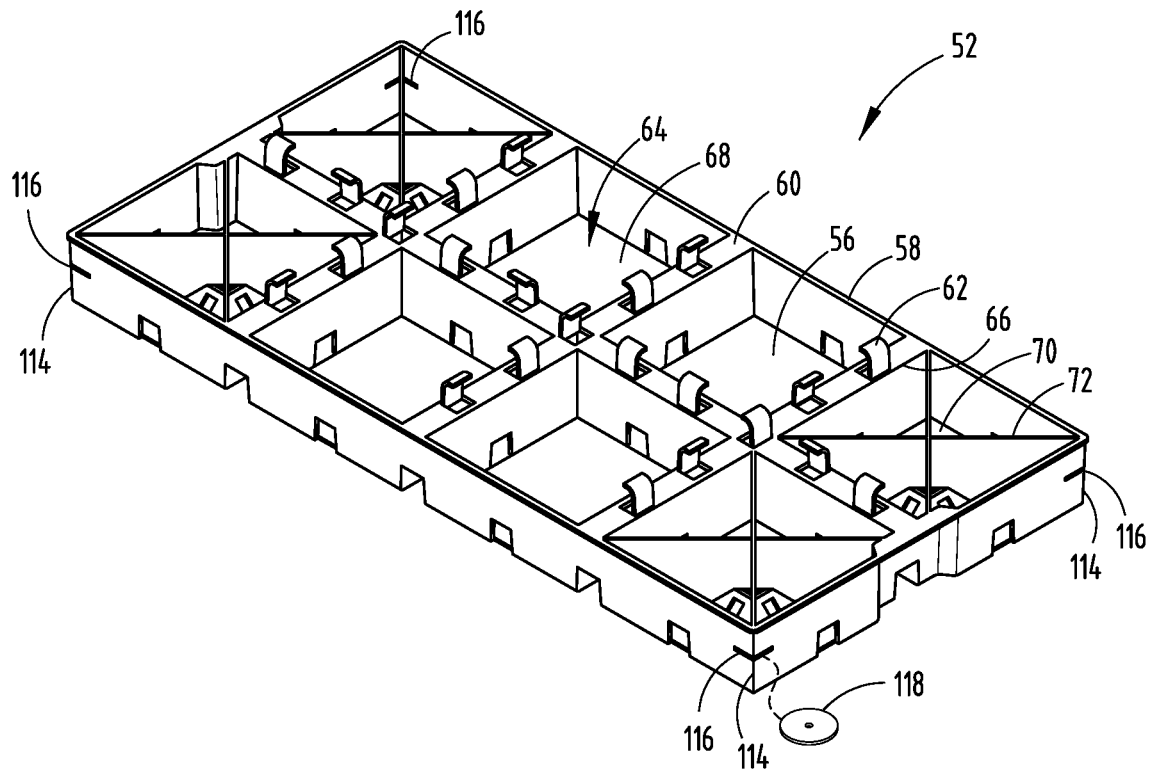
FIG. 8 is a perspective view of a substrate member of the paver assembly.
Figure 9:
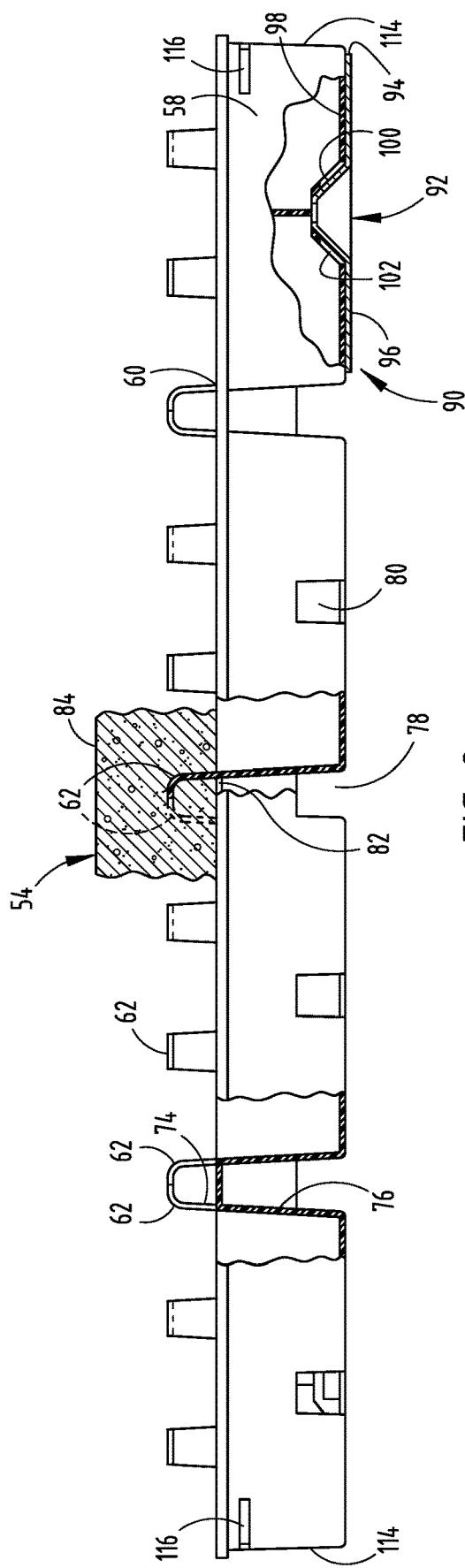
FIG. 9 is a partially cross-sectional side view of the substrate member.

The reference numeral 50 (FIG. 7) generally designates a paver assembly. In the illustrated example, a plurality of the paver assemblies 50 are used in conjunction with a plurality of modular planting assemblies 14 utilized to provide a vegetated roof system upon the building roof 12. The plurality of paver assemblies 50 cooperate to provide a support structure upon which persons can move about the vegetated roof system in order to maintain the same, enjoy the park-like setting as created by the system, and the like. As best illustrated in FIG. 7, each paver assembly 50 comprises a substrate member 52 and an over-molded paver member 54. The substrate member 52 is preferably constructed of a recycled polypropylene material, however, other materials compatible for such use may be utilized. The substrate member 52 (FIG. 8) includes a box-like structure having a bottom wall 56 adapted to support the paver assembly 50 above the roof surface, a plurality of sidewalls 58 extending upwardly from the bottom wall 56, a top wall 60, and a plurality of engagement members 62 extending upwardly from the top wall 60. The bottom wall 56 and the sidewalls 58 cooperate to form an interior space 64 that is subdivided into multiple compartments via a plurality of intermediate walls 66 extending between pairings of sidewalls 58. In the illustrated example, the interior space 64 is divided into eight compartments including central compartments 68 and end compartments 70. Each end compartment 70 is subdivided by crosswise-extending structural reinforcement walls 72 that serve to structurally reinforce the outwardly lying end portions of the substrate member 52 and overall paver assembly 50, as described below. As best illustrated in FIG. 9, each engagement member 62 is hook-shaped, and includes an outer surface 74 that is aligned with an outer surface 76 of a corresponding intermediate wall 66, thereby serving to structurally reinforce the engagement member 62 as the engagement member 62 is positioned directly above and extends upwardly from the intermediate wall 66.

A plurality of water passages 78 extend beneath the substrate member 52 and are formed by cooperating pairs of intermediate walls 66, thereby allowing water to pass beneath the paver assembly 50. In addition, a plurality of apertures 80 extend through the intermediate walls 66 and the sidewalls 58, thereby providing fluid communication between the interior space 64 of the substrate member 52 and allowing water to pass from the interior space 64 to the water passages 78 and/or the exterior of the substrate member 52.

The paver member 54 includes a bottom surface 82, a top surface 84, and a plurality of side surfaces 86 extending therebetween. The top surface 84 is adapted to support a person thereon. The paver member 54 is preferably constructed from a light-weight concrete, or other suitable material that may be formed about the engagement members 62 of the substrate member 52, as described below.

As best illustrated in FIG. 7, the paver member 54 is formed to include a plurality of irregularities in the form of rectangularly-shaped tabs 88 extending outwardly from the side surfaces 84. In use, the tabs 88 abut the tabs 88 of adjacently-positioned paver assemblies 50, and cooperate to form gaps or spaces between abutting paver assemblies, thereby allowing water to flow therebetween.

Figure 10:
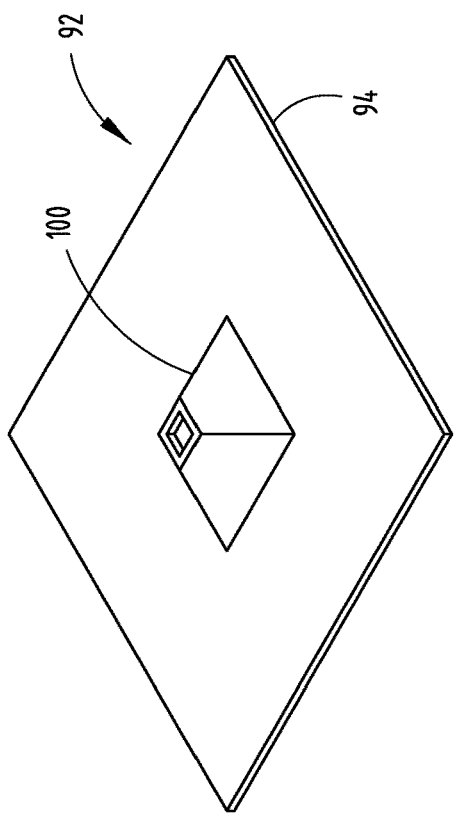
FIG. 10 is a perspective view of a shim member utilized for supporting the paver assembly.

In order to compensate for unlevel roof structures, a shim system 90 (FIG. 9) is provided. Each shim 92 (FIG. 10) is provided a square-shape body portion 94 having a bottom surface 96 adapted to abut the roof structure, and a top surface 98 adapted to abut a portion of the bottom wall 56 of the substrate member 52. A trapezoidally-shaped engagement member 100 extends upwardly from the body portion 94 and is received into a corresponding trapezoidally-shaped recess 102 extending into the bottom wall 56 of the substrate member 52. The corresponding trapezoidal-shape of both the engagement member 100 and the recess 102 cooperate to properly orient the shim member 92 with respect to the paver assembly 50, and also prevents the shim member 92 from shifting with respect to the paver assembly 50 subsequent to assembly. The shim member 92 is preferably constructed of a recycled polypropylene material, however, other material suitable for such use may be utilized.

Figure 11:
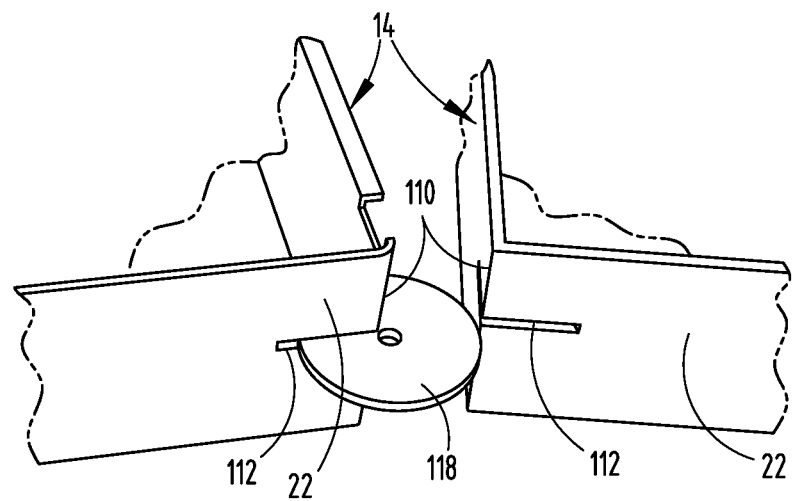
FIG. 11 is a perspective view of a coupling member inserted within slots of multiple planter modules.
Figure 12:
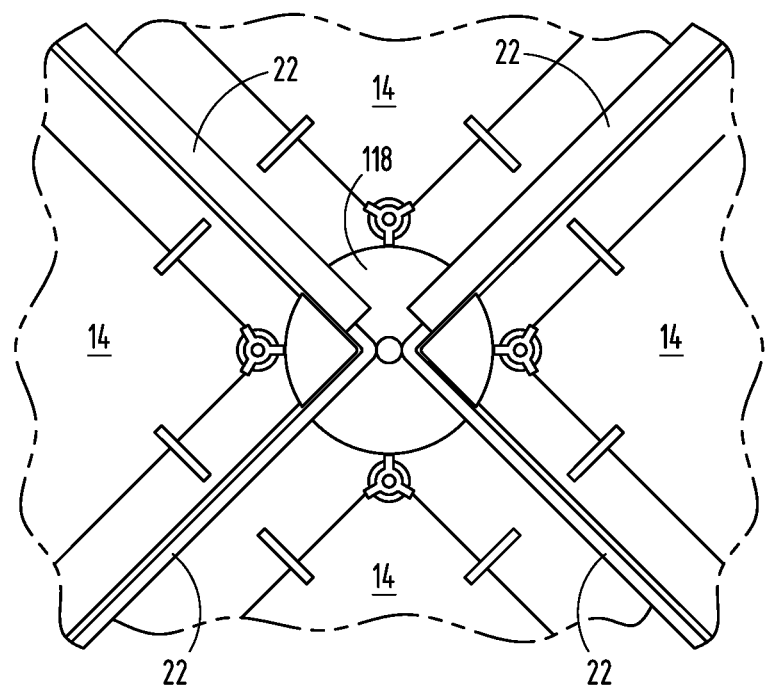
FIG. 12 is a top plan view of the coupling member coupling a plurality of adjacent planter modules.
Figure 13:
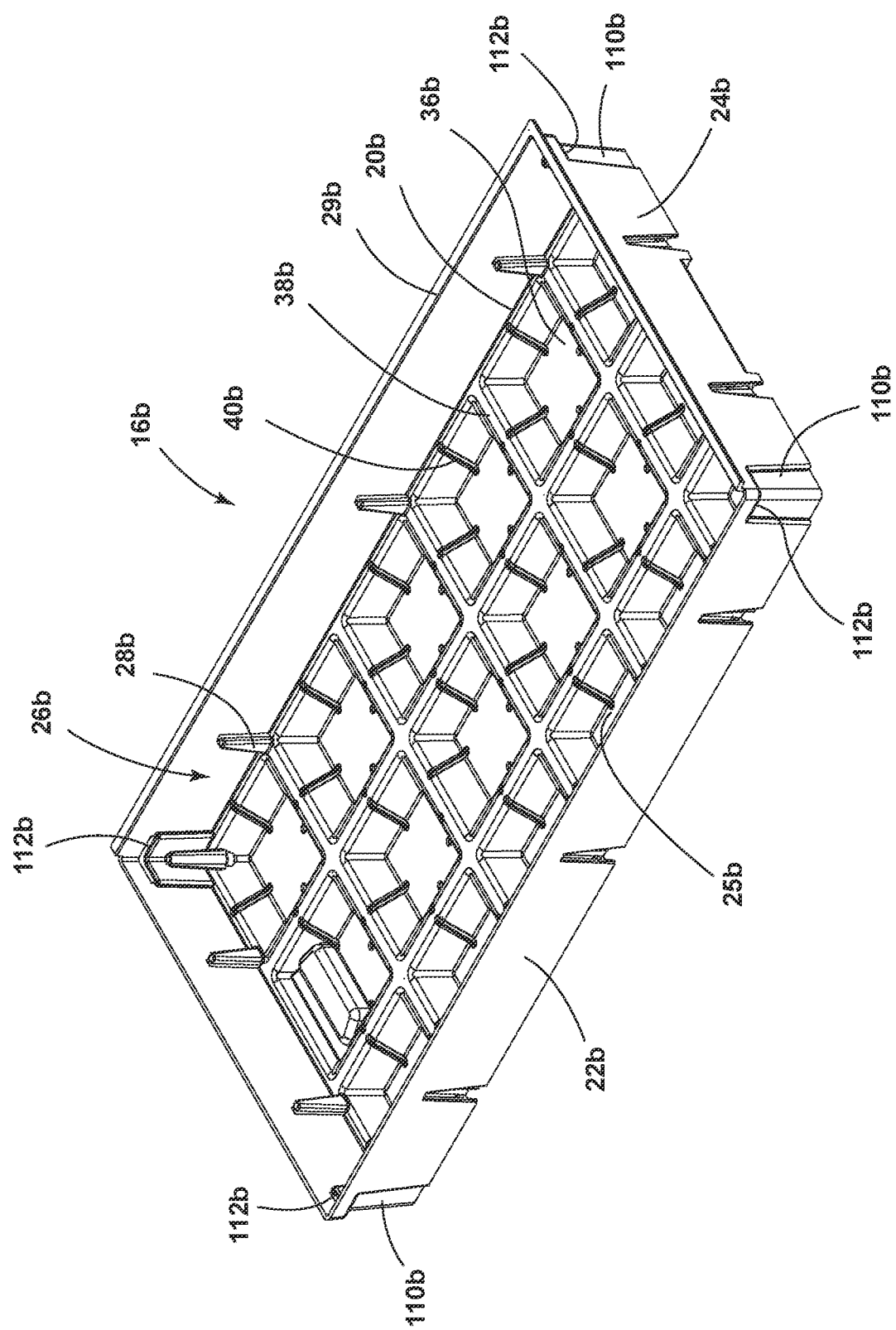
FIG. 13 is a perspective view of an alternative embodiment of the planter.
Figure 14:
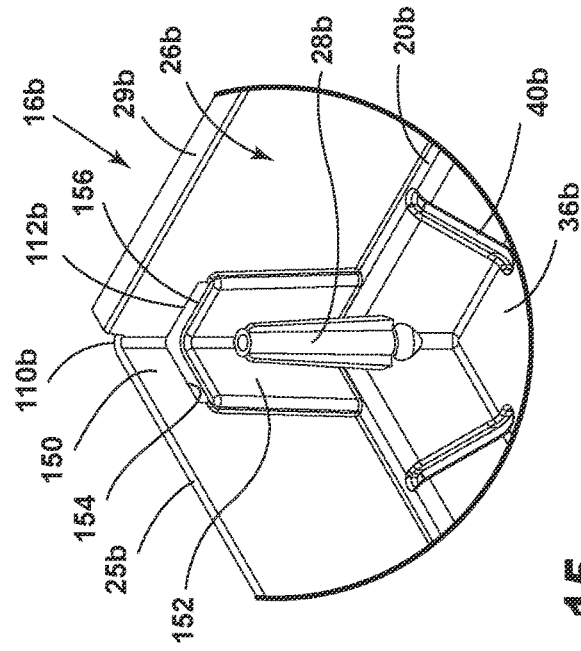
FIG. 14 is a partial perspective view of a corner of the planter FIG. 13.
Figure 15:
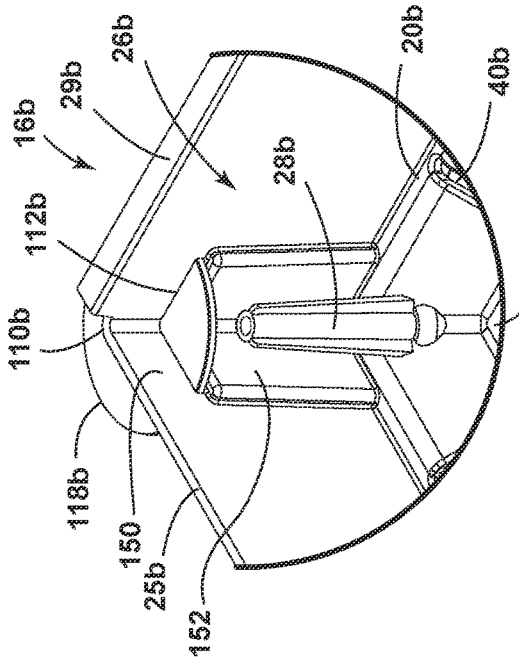
FIG. 15 is a second partial perspective view of the corner of the planter of FIG. 13.
Figure 16:
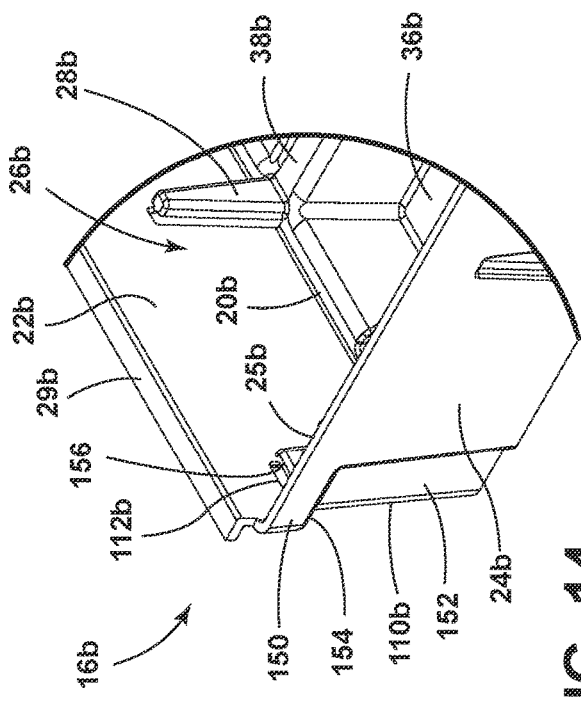
FIG. 16 is a partial perspective view of the corner of FIG. 15 showing a coupling member.
Figure 17:
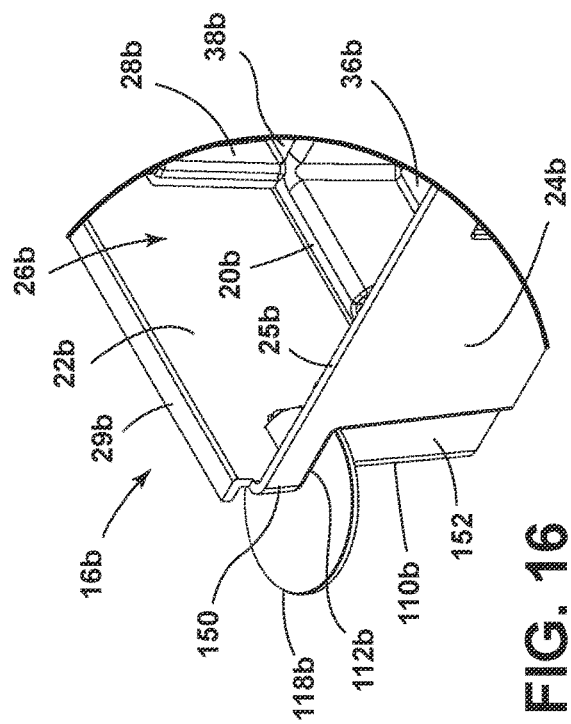
FIG. 17 is a second partial perspective view of the corner of FIG. 15 with the coupling member.
Figure 19:
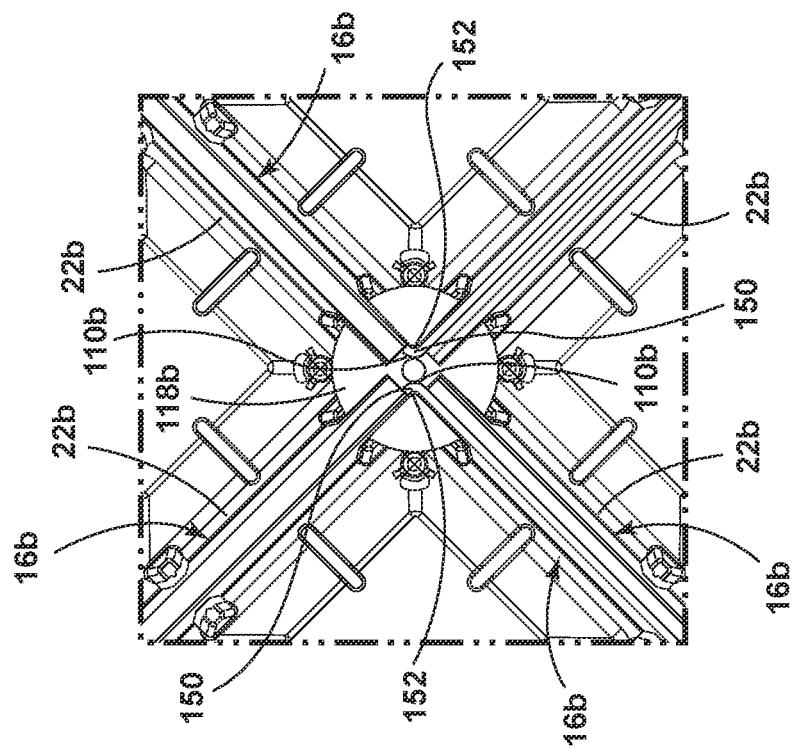
FIG. 19 is a top plan view of the coupling member with four planters.
Figure 18:
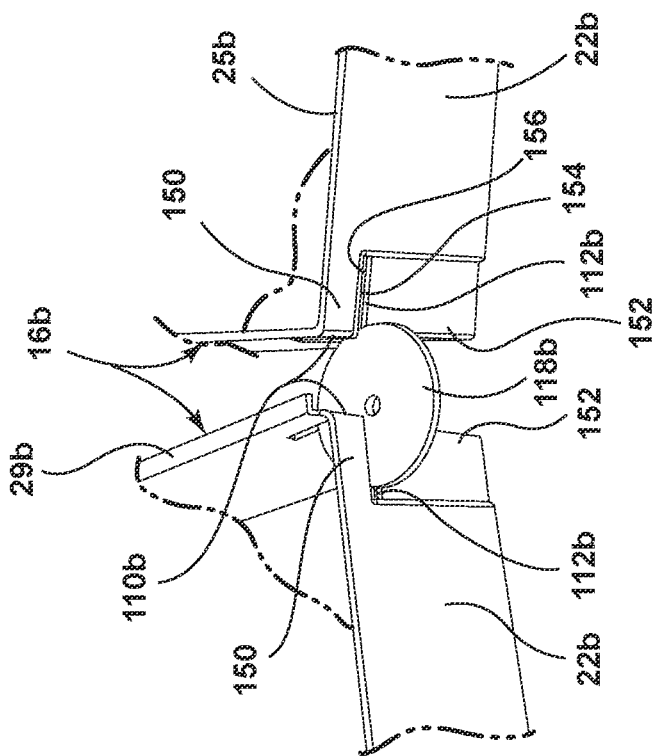
FIG. 18 is a perspective view of the coupling member with two planters.

Each corner 110 (FIGS. 2-4 and 6) of each of the planters 16 located between adjacent sidewalls 22 are provided with slots 112 extending horizontally and longitudinally along the sidewalls 22, while each corner 114 (FIGS. 7-9) of each of the substrate members 54 are provided with slots 116 extending horizontally and longitudinally along the sidewalls 58, wherein the slots 112 and the slots 116 receive a coupling member 118 therein, thereby preventing any single planter module 14 and/or paver assembly 50 from being displaced a vertical direction without necessarily also vertically displacing adjacent planter modules 14 and/or paver assemblies 50. As best illustrated in FIGS. 11 and 12, each coupling member 118 is disk-shaped being substantially planar and having a circular plan form. The interlocking arrangement as provided by the coupling members 118 prevent single or multiple planter modules 14 and/or paver assemblies from being dislodged and displaced from the associated roof surface during inclement conditions such as high winds.

The reference numeral 16b (FIGS. 14-19) generally designates another embodiment of the planter of the green roof system or assembly. Since the planter 16b is similar to the previously described planter 16, similar parts appearing in FIGS. 2-4, 11 and 12 and FIGS. 14-19 respectively are represented by the same, corresponding reference numeral except for the suffix "b" in the numerals of the latter. In the illustrated example, each planter 16b includes a bottom wall 20b, a plurality of walls that include sidewalls 22b and end walls 24b that cooperate with the bottom wall 20b to form an interior space 26b, and a plurality of support tabs 28b spaced about the interior space 26b and that extend inwardly toward the interior space 26b. Each of the sidewalls 22b and end walls 24b include a top edge 25b. The planter 16b is preferably integrally molded by press forming, and the like, and is constructed of a material such as plastic. In the illustrated example, the planter 16b is providing a rectangularly-shaped overall plan form, however, other configurations may also be utilized. As illustrated, one of the sidewalls 22b and one of the end walls 24b each include an outwardly-extending overlap tab 29*b* that overlaps a respective sidewall or end wall of an adjacent planter 16*b*, thereby coupling adjacent planters 16*b* to one another with respect to relative vertical movement, and prevent lifting of the planters 16*b* from things such as wind shear.

Each corner 110*b* of each of the planters 16*b* located between adjacent sidewalls 22*b* are provided with an upper portion 150 and a lower portion 152 divided from one another by reliefs in the form of slots 112*b* extending horizontally and longitudinally along the sidewalls 22*b*. In the illustrated example, each upper portion 150 includes a bottom edge of wall 154 and extends between the bottom edge 154 and the top edge 25 of one of the walls 22*b*, 24*b*, while each lower portion 152 includes a top edge or wall 156 and extends between a top surface of the bottom wall 20*b* and the top edge 156. As best illustrated in FIGS. 15, 16, 19 and 20, the planter 16*b* is configured such that the lower portion 152 is spaced inwardly from the upper portion 150 with respect to the interior space 26*b*, and such that the top edge or wall 156 of the lower portion 152 is entirely horizontally offset or non-overlapping, and horizontally spaced from the bottom edge 154 of the top portion 150.

In assembly or during installation, a pair of planters 16*b* containing a plant matter therein may be placed on a roof surface such that the corner 110*b* of each planter 16*b* are in close proximity to one another. A coupler 118*b* may then be inserted into a relief 112*b* of each of the planters 16*b*, such that the coupler 118*b* and the tab 29*b* couple the adjacent planters 16*b* together in an interlocking relationship to prevent the planters 16*b* from being dislodged and/or displaced from the associated roof surface during inclement conditions such as high winds. Additional planters 16*b* may also be utilized in the overall arrangement, such as by placing a third planter 16*b* proximate the pair of coupled planters 16*b*, and then moving the third planter 16*b* across the roof surface in a horizontal direction until the coupler 118*b* is received within the slots 112*b* of the third planter 16*b*. A fourth planter 16*b* may be coupled to the three coupled planters 16*b* in a similar manner.

The present inventive green roof system provides coverage of an entire roof area quickly and economically by allowing the associated modules to be grown off-sight in a manner that allows the plant matter to extend upwardly from an associated planter and plant matter within adjacent modules to abut immediately upon installation. The roof system is also easy to install at a relatively low cost. Further, the system provides improved water communication and drainage between adjacent modules, allows easy maintenance of the overall system, can be installed easily and quickly by even unskilled personnel, is capable of a long-operating life, and is particularly well adapted for the proposed use. Moreover, the present inventive interlocking arrangement between adjacent modules/assemblies prevents any single module/assembly from being vertically displaced without necessarily vertically displacing adjacent modules/assemblies.

In the foregoing description, it will be readily appreciated by those skilled in the art, that modifications may be made to the invention without departing from the concepts as disclosed herein, such modifications are to be considered as included in the following claims, unless these claims by their language expressly state otherwise.

The invention claimed is:

1. A roof planter assembly, comprising:
   a first planter module including a bottom wall and a plurality of sidewalls that cooperate with the bottom wall of the first planter module to form an interior space of the first planter module configured to receive plant matter therein, wherein at least a pair of the plurality of sidewalls of the first planter module cooperate to form a first corner therebetween, the first corner including a first portion and a second portion each positioned along a vertical length of the first corner where the second portion extends only partially along a horizontal length of at least two of the sidewalls of the plurality of sidewalls and is offset from the first portion inwardly toward the interior space of the first planter module, the first portion having a bottom edge and the second portion have a top edge defining a first relief therebetween where the bottom edge and the top edge are vertically spaced from one another by a height of the first relief;
   a second planter module including a bottom wall and a plurality of sidewalls that cooperate with the bottom wall of the second planter module to form an interior space of the second planter module configured to receive plant matter therein, wherein at least a pair of the plurality of sidewalls of the second planter module cooperate to form a second corner therebetween, the second corner including a first portion and a second portion each positioned along a vertical length of the second corner where the second portion of the second corner extends only partially along a horizontal length of at least two of the walls of the plurality of sidewalls of the second planter module and is offset from the first portion of the second corner inwardly toward the interior of the second planter module, the first portion of the second corner having a bottom edge and the second portion of the second corner have a top edge defining a second relief therebetween where the bottom edge of the first portion of the second corner and the top edge of the second portion of the second corner are vertically spaced from one another by a height of the second relief;
   a coupling member removably received within the first relief and the second relief, thereby inhibiting vertical movement of the first planter module with respect to the second planter module, wherein the coupling member abuts the top edge of the second portion of the first corner and the top edge of the second portion of the second corner;
   wherein the first portion of the first corner extends from an upper edge of at least one of the plurality of sidewalls of the first planter module to the bottom edge of the first portion of the first corner; and
   wherein the second portion of the first corner extends from an upper surface of the bottom wall of the first planter module and to the top edge of the second portion of the first corner.

2. The roof planter assembly of claim 1, wherein an entirety of the first portion of the first corner is positioned outwardly from an entirety of the second portion of the first corner with respect to the interior space of the first planter module.

3. The roof planter assembly of claim 1, wherein the bottom edge of the first portion of the first corner and the top edge of the second portion of the first corner are entirely spaced from one another in the horizontal direction.

4. The roof planter assembly of claim 1, further comprising:
   a third planter module including a bottom wall and a plurality of sidewalls that cooperate with the bottom wall of the third planter module to form an interior space of the third planter module configured to receive plant matter therein, wherein at least a pair of the plurality of sidewalls of the third planter module cooperate to form a third corner therebetween, the third corner including a first portion and a second portion each positioned along a vertical length of the third corner where the second portion of the third corner extends only partially along a horizontal length of one of at least two of the walls of the plurality of walls of the third planter module and is offset from the first portion of the third corner inwardly toward the interior space of the third planter module, the first portion of the third corner having a bottom edge and the second portion of the third corner have a top edge defining a third relief therebetween where the bottom edge of the first portion of the third corner and the top edge of the second portion of the third corner are vertically spaced from one another by a height of the third relief, wherein the coupling member is removably received within the third relief, thereby inhibiting vertical movement of the third planter module with respect to the first and second planter modules, and wherein the coupling member abuts the top edge of the second portion of the third corner.

5. The roof planter assembly of claim 1, wherein the first relief comprises a slot extending longitudinally along a length of each of the pair of sidewalls of at least one of the plurality of sidewalls of the first planter module.

6. The roof planter assembly of claim 1, wherein the coupling member is a single, integral piece.

7. The roof planter assembly of claim 6, wherein the coupling member comprises a planar member having a circular cross-section configuration.

8. The roof planter assembly of claim 1, wherein the first planter module further includes a collar member extending upwardly from at least a select one of the plurality of sidewalls of the first planter module, and wherein the collar member is adapted to retain a plant matter that extends above the plurality of sidewalls of the first planter module.

9. The roof planter assembly of claim 8, wherein the collar member is biodegradable.

10. A roof planter module, comprising:
a bottom wall;
a plurality of sidewalls;
an interior space formed by the bottom wall and the plurality of sidewalls, wherein the interior space is configured to receive plant matter therein; and
a corner formed between a pair of the plurality of sidewalls, the corner including a first portion and a second portion each positioned along a vertical length of the corner, the first portion having a bottom edge and the second portion have a top edge defining a slot therebetween where the slot extends longitudinally along the pair of sidewalls wherein the second portion extends only partially along a horizontal length of each of the pair of sidewalls and is offset from the first portion inwardly toward the interior space, wherein the top edge is entirely horizontally offset from the bottom edge toward the interior space, wherein the bottom edge and the top edge are vertically spaced from one another by a height of the relief, wherein the slot is configured to receive a coupling member configured to couple an adjacent roof planter module to the roof planter module such that the coupling member abuts the top edge of the second portion, wherein the first portion extends from an upper edge of at least one of the plurality of sidewalls to the bottom edge of the first portion, and wherein the second portion extends from an upper surface of the bottom wall to the top edge.

11. The roof planter module of claim 10, wherein an entirety of the first portion is positioned outwardly from an entirety of the second portion with respect to the interior space.

12. The roof planter assembly of claim 10, wherein the bottom edge and the upper edge are entirely spaced from one another in the horizontal direction.

13. The roof planter assembly of claim 10, wherein the bottom edge is entirely spaced from a top edge of at least one of the plurality of sidewalls in the horizontal direction.

14. A method of installing a roof planter assembly, comprising:
providing a first planter module including a bottom wall and a plurality of sidewalls that cooperate with the bottom wall of the first planter module to form an interior space of the first planter module configured to receive plant matter therein, wherein at least a pair of the plurality of sidewalls of the first planter module cooperate to form a first corner therebetween, the first corner including a first portion and a second portion each positioned along a vertical length of the first corner where the second portion of the first corner extends only partially along a horizontal length of at least two of the sidewalls of the plurality of sidewalls and is offset from the first portion inwardly toward the interior space of the first planter module, the first portion having a bottom edge and the second portion have a top edge defining a first relief therebetween where the bottom edge and the top edge are vertically spaced from one another by a height of the first relief,
providing a second planter module including a bottom wall and a plurality of sidewalls that cooperate with the bottom wall of the second planter module to form an interior space of the second planter module configured to receive plant matter therein, wherein at least a pair of the plurality of sidewalls of the second planter module cooperate to form a second corner therebetween, the second corner including a first portion and a second portion each positioned along a vertical length of the second corner where the second portion of the second corner extends only partially along a horizontal length of at least two of the sidewalls of the plurality of sidewalls of the second planter module and is offset from the first portion of the second corner inwardly toward the interior space of the second planter module, the first portion of the second corner having a bottom edge and the second portion of the second corner have a top edge defining a second relief therebetween where the bottom edge of the first portion of the second corner and the top edge of the second portion of the second corner are vertically spaced form one another by a height of the second relief, wherein the top edge of the second portion of the second corner is entirely inwardly offset from the bottom edge of the first portion of the second corner toward the interior space of the second planter module;
providing a coupling member configured to be received within the first relief and the second relief;
positioning the first corner of the first planter module and the second corner of the second planter module proximate one another; and
inserting the coupling member into the first relief of the first planter module and the second relief of the second planter module such that the coupling member abuts the top edge of the second portion of the first corner of the first planter module and the top edge of the second portion of the second corner of the second planter module, thereby inhibiting vertical movement of the first planter module with respect to the second planter module;

wherein the first portion of the first corner extends from an upper edge of at least one of the plurality of sidewalls of the first planter module to the bottom edge of the first portion of the first corner; and wherein the second portion of the first corner extends from an upper surface of the bottom wall of the first planter module and to the top edge of the second portion of the first corner.

15. The method of claim 14, further comprising:

providing a third planter module including a bottom wall and a plurality of sidewalls that cooperate with the bottom wall of the third planter module to form an interior space of the third planter module configured to receive plant matter therein, wherein at least a pair of the plurality of sidewalls of the third planter module cooperate to form a third corner therebetween, the third corner including a first portion and a second portion each positioned along a vertical length of the third corner where the second portion of the third corner extends only partially along a horizontal length of at least two of the sidewalls of the plurality of sidewalls of the third planter module and is offset from the first portion of the third corner inwardly toward the interior space of the third planter, the first portion of the third corner having a bottom edge and the second portion of the third corner have a top edge defining a third relief therebetween where the bottom edge of the first portion of the third corner and the top edge of the second portion of the third corner are vertically spaced from one another by a height of the third relief;

providing a fourth planter module including a bottom wall and a plurality of sidewalls that cooperate with the bottom wall of the third planter module to form an interior space of the fourth planter module configured to receive plant matter therein, wherein at least a pair of the plurality of sidewalls of the fourth planter module cooperate to form a fourth corner therebetween, the fourth corner including a first portion and a second portion each positioned along a vertical length of the third corner where the second portion of the fourth corner extends only partially along a horizontal length of at least two of the sidewalls of the plurality of sidewalls of the fourth planter module and is offset from the first portion of the fourth corner inwardly toward the interior space of the fourth planter module, the first portion of the fourth corner having a bottom edge and the second portion of the fourth corner have a top edge defining a fourth relief therebetween where the bottom edge of the first portion of the fourth corner and the top edge of the second portion of the fourth corner are vertically spaced from one another by a height of the fourth relief; and positioning the third corner of the third planter module and the fourth corner of the fourth planter module proximate the first corner of the first planter module and the second corner of the second planter module such that the coupling member is received within the third relief of the third planter module and the fourth relief of the fourth planter module and the coupling member abuts the top edge of the second portion of the third corner of the third planter module and the top edge of the second portion of the fourth corner of the fourth planter module, thereby inhibiting vertical movement of the first planter module, the second planter module, the third planter module and the fourth planter module with respect to one another.

16. The method of claim 15, wherein an entirety of the first portion of the first corner is positioned outwardly from an entirety of the second portion of the first corner with respect to the interior space of the first planter module.

\* \* \* \* \*